United States Patent [19]

Nakahashi et al.

[11] Patent Number: 5,404,060
[45] Date of Patent: Apr. 4, 1995

[54] MINIATURE MOTOR WITH WORM REDUCTION GEAR

[75] Inventors: Hiroaki Nakahashi; Kazuo Nakamura, both of Matsudo, Japan

[73] Assignee: Mabuchi Motor Co., Ltd., Chiba, Japan

[21] Appl. No.: 124,274

[22] Filed: Sep. 20, 1993

Related U.S. Application Data

[63] Continuation of Ser. No. 766,448, Sep. 25, 1991, abandoned.

[30] Foreign Application Priority Data

Sep. 27, 1990 [JP] Japan .................. 2-258629

[51] Int. Cl.6 .................. H02K 7/06; F16H 1/16
[52] U.S. Cl. .................. 310/83; 310/43; 310/99; 29/893.37; 74/425
[58] Field of Search .......... 310/40 MM, 42, 43, 45, 310/80, 83, 99; 74/89.14, 425, DIG. 10; 29/893.31, 893.34, 893.37, 893, 24, 90.6, DIG. 16, DIG. 19, DIG. 26

[56] References Cited

U.S. PATENT DOCUMENTS

| | | | |
|---|---|---|---|
| 2,331,909 | 10/1943 | Hensel et al. | 74/425 |
| 2,363,337 | 11/1944 | Kelly | 29/893.31 |
| 3,067,627 | 12/1962 | Pickles | 74/425 |
| 3,535,948 | 10/1970 | Winzeler et al. | 74/440 |
| 3,703,756 | 11/1972 | Chesters | 29/159.2 |
| 3,848,477 | 11/1974 | Giandinoto et al. | 74/425 |
| 4,047,449 | 9/1977 | Popov | 74/458 |
| 4,077,274 | 3/1978 | Johnson | 74/425 |
| 4,226,136 | 10/1980 | Porter et al. | 74/416 |
| 4,399,380 | 8/1983 | Hirano | 310/62 |
| 4,768,281 | 9/1988 | Diessner | 29/558 |
| 4,987,791 | 1/1991 | Nakahashi et al. | 74/425 |

Primary Examiner—Thomas M. Dougherty
Assistant Examiner—D. R. Haszko
Attorney, Agent, or Firm—McGlew and Tuttle

[57] ABSTRACT

A miniature motor with worm reduction gear outputting the revolution of a miniature motor via a worm reduction gear consisting of a worm and a worm wheel, in which the tooth surface of the worm is roughened into a stain finish, and then subjected to a surface treatment to improve wear resistance.

15 Claims, 4 Drawing Sheets

FIG. 4

(UNIT : Kg · cm)

| MOTOR NO. | ROTATING DIRECTION | INITIAL | AFTER 5000 CYCLES | AFTER 10000 CYCLES | AFTER 15000 CYCLES | AFTER 20000 CYCLES | AFTER 30000 CYCLES |
|---|---|---|---|---|---|---|---|
| 1 | CW | 150 | 80 | 100 | 95 | 120 | 130 |
|   | CCW | 150 | 90 | 90 | 150 | 120 | 135 |
| 2 | CW | 150 | 80 | 85 | 90 | 110 | 150 |
|   | CCW | 150 | 80 | 80 | 95 | 120 | 150 |
| 3 | CW | 150 | 150 | 150 | 130 | 130 | 120 |
|   | CCW | 150 | 120 | 150 | 100 | 105 | 105 |
| 4 | CW | 150 | 110 | 90 | 100 | 85 | 140 |
|   | CCW | 150 | 90 | 90 | 95 | 90 | 105 |
| AVERAGE VALUE | | 150 | 100 | 104 | 107 | 98 | 129 |

FIG. 5

(UNIT : Kg · cm)

| MOTOR NO. | ROTATING DIRECTION | INITIAL | AFTER 5000 CYCLES | AFTER 10000 CYCLES | AFTER 15000 CYCLES | AFTER 20000 CYCLES | AFTER 30000 CYCLES |
|---|---|---|---|---|---|---|---|
| 1 | CW | 86 | 88 | 84 | 79 | 79 | 76 |
|   | CCW | 85 | 94 | 89 | 86 | 89 | 83 |
| 2 | CW | 80 | 83 | 83 | 82 | 80 | 78 |
|   | CCW | 83 | 96 | 94 | 98 | 94 | 90 |
| 3 | CW | 90 | 91 | 84 | 91 | 91 | 87 |
|   | CCW | 84 | 81 | 79 | 83 | 81 | 76 |
| 4 | CW | 82 | 94 | 97 | 93 | 99 | 89 |
|   | CCW | 82 | 81 | 84 | 81 | 81 | 79 |
| AVERAGE VALUE | | 84 | 89 | 87 | 87 | 87 | 82 |

FIG. 6

(UNIT : Kg · cm)

| MOTOR NO. | ROTATING DIRECTION | INITIAL | AFTER 1000 CYCLES | AFTER 5000 CYCLES | AFTER 10000 CYCLES | AFTER 20000 CYCLES | AFTER 30000 CYCLES |
|---|---|---|---|---|---|---|---|
| 1 | CW | 150 | 35 | 30 | 150 | 150 | 150 |
|   | CCW | 150 | 40 | 35 | 150 | 150 | 150 |
| 2 | CW | 150 | 35 | 30 | 150 | 150 | 150 |
|   | CCW | 150 | 40 | 35 | 150 | 150 | 150 |
| 3 | CW | 150 | 40 | 25 | 150 | 150 | 150 |
|   | CCW | 150 | 35 | 30 | 150 | 150 | 150 |
| 4 | CW | 150 | 40 | 30 | 150 | 150 | 150 |
|   | CCW | 150 | 40 | 30 | 150 | 150 | 150 |
| AVERAGE VALUE | | 150 | 38 | 31 | 150 | 150 | 150 |

FIG. 7

(UNIT : Kg · cm)

| MOTOR NO. | ROTATING DIRECTION | INITIAL | AFTER 1000 CYCLES | AFTER 5000 CYCLES | AFTER 10000 CYCLES | AFTER 20000 CYCLES | AFTER 30000 CYCLES | AFTER 40000 CYCLES |
|---|---|---|---|---|---|---|---|---|
| 1 | CW | 88 | 96 | 97 | 69 | 71 | 71 | 74 |
|   | CCW | 88 | 100 | 105 | 77 | 92 | 80 | 74 |
| 2 | CW | 87 | 95 | 94 | 70 | 72 | 68 | 72 |
|   | CCW | 88 | 101 | 102 | 76 | 70 | 70 | 67 |
| 3 | CW | 90 | 101 | 109 | 81 | 85 | 83 | 81 |
|   | CCW | 81 | 89 | 101 | 73 | 74 | 67 | 70 |
| 4 | CW | 91 | 94 | 106 | 79 | 80 | 78 | 74 |
|   | CCW | 85 | 93 | 95 | 72 | 70 | 66 | 69 |
| AVERAGE VALUE | | 87 | 96 | 101 | 75 | 77 | 73 | 73 |

MINIATURE MOTOR WITH WORM REDUCTION GEAR

This is a continuation of application Ser. No. 07/766,448, filed Sep. 25, 1991, abandoned.

BACKGROUND OF THE INVENTION

This invention relates generally to a miniature motor with worm reduction gear used for opening and closing door windows of automobiles while ensuring security and safety, and more particularly to a miniature motor with a worm reduction gear designed to maintain required reversing torque resistance while maintaining the output torque of the motor by subjecting the worm of the worm reduction gear to special surface treatments.

DESCRIPTION OF THE PRIOR ART

In a miniature motor with a worm reduction gear, its mechanical transmission efficiency generally tends to be improved during the initial wear (break-in) stage of the tooth surface and other sliding members, and the contact ratio of the tooth surface tends to deteriorate as the tooth surface wears away. Thus, the conventional miniature motor with a worm reduction gear usually exhibits characteristics shown by dotted lines in FIGS. 2 and 3. FIG. 2 shows changes in reversing torque resistance (self lock) with service time, and FIG. 3 changes in the output torque of motor with service time. Both figures reveal a great difference in these values among the initial, intermediate and final stages of service time. Miniature motors used for vertically opening and closing door windows in automobiles tend to involve lowered reversing torque resistance in the intermediate stage of service, giving rise to such an inconvenience that windows are forcibly opened from the outside.

Where there is a need for higher reversing torque resistance, the lead angle of the worm is set to a very small value, or a brake unit is incorporated inside the motor to maintain reversing torque resistance at a high level in the conventional miniature motors with worm reduction gears.

With the former method relying on the worm lead angle to maintain reversing torque resistance, however, setting the worm lead angle to such a small value as to maintain the required reversing torque resistance would inevitably increase the outside diameter of the worm, making it difficult to reduce the size of miniature motors with worm reduction gears.

The latter method of incorporating a brake unit inside the motor, on the other hand, is effective in maintaining high reversing torque resistance, but is associated with the increased number of parts and increased assembling manhours.

Furthermore, both methods, while achieving high reversing torque resistance and high output torque, pose the problem of sacrificing the output performance of the motor.

SUMMARY OF THE INVENTION

It is an object of this invention to provide a miniature motor with worm reduction gear in which stable motor-reversing torque resistance and high output torque are maintained by subjecting the worm to special surface treatments.

To achieve this, the miniature motor with worm reduction gear of this invention, whose output is transmitted via a worm reduction gear having a worm and a worm wheel or helical gear, is intended to accomplish high reversing torque resistance by subjecting the tooth surface of the worm to a satin-finish surface treatment and to a surface treatment to improve wear resistance.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWING

FIG. 1 (A) being a cross-sectional view of the worm reduction gear section, and

FIG. 1 (B) an enlarged cross-sectional view of the worm.

FIGS. 4 through 7 summarize part of the test results obtained in preparing the curves shown in FIGS. 2 and 3;

FIGS. 4 and 5 showing the reversing torque resistance and output torque of this intention in which the worm is surface treated, and FIGS. 6 and 7 showing the reversing torque resistance and output torque of the conventional product.

DETAILED DESCRIPTION OF THE EMBODIMENT

Figure 1A:
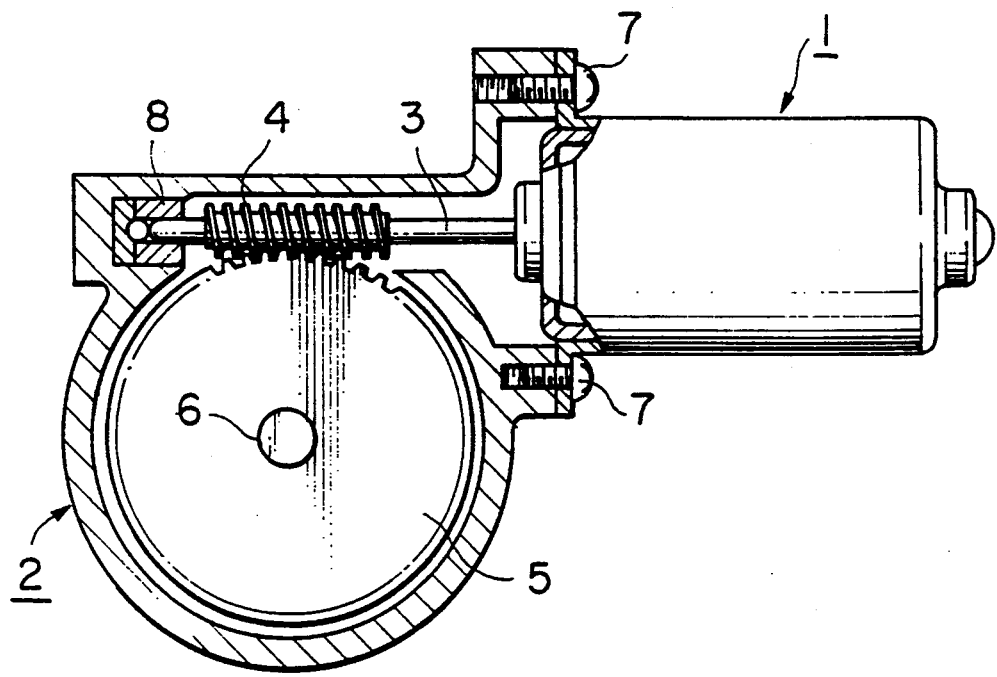
FIG. 1 is a diagram of assistance in explaining an embodiment of this invention.
Figure 1B:
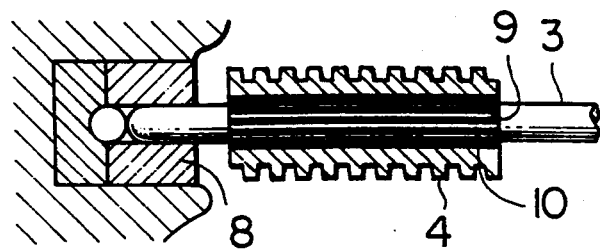

FIG. 1 is a diagram of assistance in explaining an embodiment of this invention; FIG. 1 (A) being a cross-sectional view of the worm reduction gear section, and FIG. 1 (B) an enlarged cross-sectional view of the worm.

In FIG. 1, a motor section 1 is mounted on a reduction gear section 2 via screws 7. One end of a motor shaft 3 in the motor section 1 is supported by a bearing 8. A worm 4 has a worm-fitting hole 9 for fitting the worm 4 to the motor shaft 3, as shown in FIG. 1 (B). A knurled portion 10 is provided on an area of the motor shaft 3 which is inserted into the worm-fitting hole 9 so that the motor shaft 3 is positively press-fitted to the worm-fitting hole 9. The worm 4 is meshed with a worm wheel, or a helical gear 5, for example, made of a synthetic resin.

The driving torque generated by the motor section 1 is transmitted from the motor shaft 3 to the worm 4, then to the helical gear 5 in the reduction gear section 2, and eventually taken out of the output shaft 6 to the outside.

In this embodiment, the worm 4, to which the driving torque is transmitted from the motor section 1, is subjected to shot blasting to give the surface roughness of approximately 2–30μ, or preferably 2–10μ in terms of RZ (10-point average roughness), then to electroless nickel plating to maintain the roughness, and then to baking treatment to improve the surface hardness; all these treatments applied at the stage of a discrete part before it is press-fitted to the motor shaft 3.

Since the worm 4 is subjected to the above-mentioned surface treatments, that is, the surface roughness of the tooth surface of the worm is controlled, an appropriate friction force can be obtained between the worm 4 and the helical gear 5. That is, the electroless nickel plating and baking treatment applied to the worm 4 impart an appropriate friction force to the worm 4. In other words, high reversing torque resistance and stable motor output torque can be stably maintained, as shown by solid lines in FIGS. 2 and 3, without adversely affecting other performances of the miniature motor with worm reduction gear.

As a method of obtaining high reversing torque resistance without sacrificing motor output performance, the friction coefficient of the tooth surface is controlled, noting that the transmission efficiency of a worm reduction gear for the case where force is transmitted from the input side to the output side is different from that for the case where force is transmitted from the input side to the output side. That is, the loss of motor performance can be minimized by properly selecting the friction coefficient to obtain the minimum required reversing torque resistance from the following equations.

Efficiency for the case where force is transmitted from the input side to the output side:

$$\eta = \tan\gamma_0 / \tan(\gamma_0 + \rho)$$

Efficiency for the case where force is transmitted from the output side to the input side:

$$\eta = \tan(\gamma_0 - \rho) / \tan\gamma_0$$

where $\gamma_0$ = load angle, $\rho = \tan^{-1}(\mu \sec \alpha_0)$,
$\alpha_0$ = pressure angle, $\mu$ = friction coefficient To obtain the desired friction coefficient, the required surface roughness is imparted to the tooth surface by employing chemical polishing, shot blasting, or any other surface treatment. For roll-formed worms, similar treatment can be applied to the worms using roll-forming dies.

In addition, by employing an appropriate surface treatment for improving wear resistance without changing the surface roughness of the tooth surface, the smooth meshing of the worm and the worm wheel can be maintained while the surface roughness is kept unchanged. Such surface treatments include baking treatment and soft nitriding treatment after electroless nickel plating.

Furthermore, dull-finish hard chromium plating can also be employed to achieve desired surface roughness and reversing torque resistance.

Figure 2:
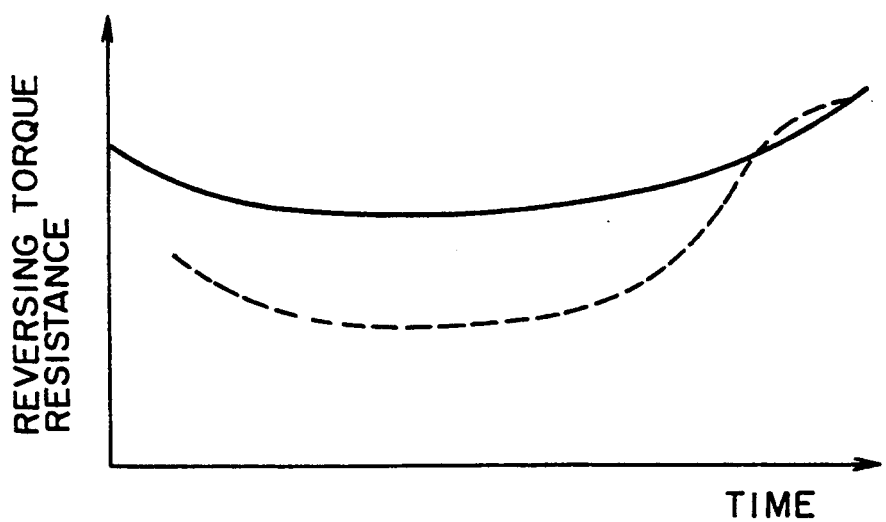
FIG. 2 is a diagram illustrating typical model characteristics curves comparing the reversing torque resistance between this invention and the conventional product.
Figure 3:
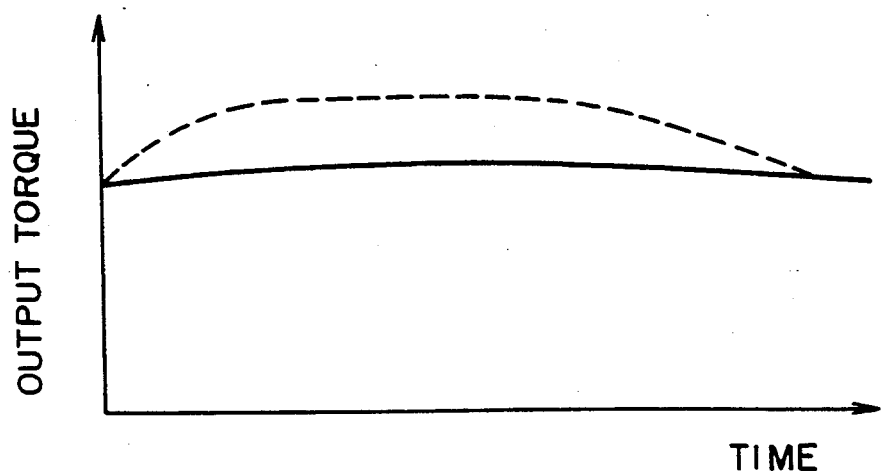
FIG. 3 is a diagram illustrating typical mode characteristic curves comparing motor output torque between this invention and the conventional product.

By using a worm having appropriate surface roughness and reversing torque resistance on the tooth surface thereof, the friction force of the meshing portions can be maintained, and high reversing torque resistance and motor output torque can be stabilized, as shown by solid lines in FIGS. 2 and 3. Curves shown in FIGS. 2 and 3 represent certain trends on the basis of many test results.

Part of the test result data on which the curves of FIGS. 2 and 3 are based are shown in FIGS. 4 through 7. FIGS. 4 and 5 illustrate the reversing torque resistance and output torque of this invention having a surface-treated worm, and FIGS. 6 and 7 those of the conventional product.

In FIGS. 4 through 7, "CW and CCW" indicate the direction of rotation; i.e., clockwise and counterclockwise. A "cycle" means one process of raising and lowering a door window with the power window system of an automobile. The "cycle" corresponds with time on the abscissa in FIGS. 2 and 3.

The construction shown in FIG. 1, in which the separately formed worm 4 is press-fitted to the motor shaft 3, has an advantage of easily subjecting the worm 4 only to a particular surface treatment, as described above. Needless to say, the same effects can be achieved by forming the motor shaft 3 and the worm 4 integrally and subjecting the worm portion only to a particular surface treatment.

As described above, this invention makes it possible to realize a miniature motor with worm reduction gear in which reversing torque resistance can be improved and motor output performance can be stabilized because an appropriate friction force is obtained and maintained between the worm and the worm wheel.

Since motor performance, such as reversing torque resistance, can be improved without increasing the number of components, small-sized miniature motors with worm reduction gears can be realized.

While a specific embodiment of the invention has been shown and described in detail to illustrate the application of the principles of the invention, it will be understood that the invention may be embodied otherwise without departing from such principles.

What is claimed is:

1. A miniature motor with a worm reduction comprising:
    a worm wheel being formed as a helical gear and said helical gear being made of a synthetic resin; and
    a worm including a tooth surface, said tooth surface is first provided with a satin finish to give a surface roughness to said tooth surface and then provided with a wear resistant treatment to improve a surface hardness of said tooth surface while maintaining said surface roughness of said tooth surface.

2. A miniature motor in accordance with claim 1, wherein:
    said surface roughness increases reversing torque resistance and maintains a substantially constant output torque.

3. A miniature motor with worm reduction gear as set forth in claim 1 wherein the tooth surface of the worm is subjected to a surface treatment to an extent that said surface roughness of the worm tooth surface is maintained between 2 $\mu_m$ RZ to 10 $\mu_m$ RZ.

4. A miniature motor with worm reduction gear as set forth in claim 1 wherein the tooth surface of the worm is subjected to a surface treatment to an extent that said surface roughness of the worm tooth surface is maintained between 2 $\mu_m$ RZ to 30 $\mu_m$ RZ.

5. A miniature motor with a worm and worm wheel arrangement comprising:
    a tooth surface on a tooth of said worm, said tooth surface having a surface roughness between 2 $\mu_m$ RZ to 30 $\mu_m$ RZ, whereby reversing torque resistance and output torque of the worm and worm wheel arrangement are maintained at a more constant level than conventional worm and worm wheel arrangements.

6. An arrangement in accordance with claim 5, further comprising:

a motor connected to said worm.

7. A miniature motor with a worm and worm wheel arrangement comprising:
- a worm wheel being formed as a helical gear and said helical gear being made of a synthetic resin; and
- a worm gear meshing with said worm wheel and having a surface finish means for maintaining reversing torque resistance and output resistance between the worm gear and the worm wheel at a more constant level than conventional worm and worm wheel arrangements without said surface finish means, said surface finish means being located on a tooth surface of the worm which contacts the worm wheel, and said surface finish means being of a satin finish type on said tooth surface, said tooth surface also having a wear resistant treatment to improve surface hardness of said tooth surface.

8. An arrangement in accordance with claim 7, wherein:
said satin finish is applied to said tooth surface by scratch-brushing a polished surface of said tooth surface.

9. An arrangement in accordance with claim 7, wherein:
said satin finish has a surface roughness of between 2 $\mu_m$ RZ to 10 $\mu_m$ RZ.

10. An arrangement in accordance with claim 7, wherein:
said satin finish has a surface roughness between 2 $\mu_m$ RZ to 30 $\mu_m$ RZ.

11. An arrangement in accordance with claim 7, wherein:
the worm wheel is a helical gear made of a synthetic resin.

12. An arrangement in accordance with claim 7, further comprising:
a motor connected to said worm gear.

13. An arrangement in accordance with claim 5, wherein:
said surface roughness is applied to said tooth surface by a method selected from the group of chemical polishing and shot blasting.

14. An arrangement in accordance with claim 5, further comprising:
a wear resistance surface treatment applied to said rough tooth surface and said wear resistant surface treatment unchanging said surface roughness.

15. An arrangement in accordance with claim 14, wherein:
said wear resistance surface treatment is selected from the group of baking, soft nitriding after electroless nickel plating and dull-finish hard chromium plating.

* * * * *